US009087079B1

(12) United States Patent  
Cecile et al.

(10) Patent No.: US 9,087,079 B1
(45) Date of Patent: Jul. 21, 2015

(54) APPARATUS, METHOD, AND COMPUTER-READABLE STORAGE MEDIUM FOR DISPLAYING A MAP AND AN IMAGE OF A DEVICE

(71) Applicants: Matt Cecile, Waterloo (CA); Tom Haapanen, Heidelberg (CA)

(72) Inventors: Matt Cecile, Waterloo (CA); Tom Haapanen, Heidelberg (CA)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/201,451

(22) Filed: Mar. 7, 2014

(51) Int. Cl.
G06F 3/12 (2006.01)
G06F 17/30 (2006.01)

(52) U.S. Cl.
CPC ........ G06F 17/30268 (2013.01); G06F 3/1207 (2013.01); G06F 3/1285 (2013.01); G06F 17/30241 (2013.01)

(58) Field of Classification Search
CPC .................... G06F 17/30241; G06F 17/30265; G06F 17/30268; G06F 3/12; G06F 3/1207; G06F 3/1278; G06F 3/1285
See application file for complete search history.

(56) References Cited

U.S. PATENT DOCUMENTS

| 7,409,452 | B2 * | 8/2008 | Ragnet et al. ................. 709/227 |
| 7,945,251 | B2 * | 5/2011 | Jendbro et al. ............. 455/414.1 |
| 8,103,317 | B2 * | 1/2012 | Kubo et al. ................... 455/574 |
| 8,166,534 | B2 * | 4/2012 | Yariv et al. ...................... 726/11 |
| 8,370,469 | B2 | 2/2013 | Wang |
| 2013/0198329 | A1 | 8/2013 | Wang |
| 2013/0198357 | A1 | 8/2013 | Wang |

OTHER PUBLICATIONS

Novell iPrint; http://www.novell.com/products/iprint/features/self_service_printing.html; Novell 2014; p. 1.
NSI Mobile; http://www.nsimobile.com/features/#feature8; 2014 Notable Solutions, Inc.; pp. 1-7.

* cited by examiner

Primary Examiner — Thomas D Lee
(74) Attorney, Agent, or Firm — Oblon, McClelland, Maier & Neustadt, L.L.P.

(57) ABSTRACT

An apparatus, method, and computer-readable storage medium including determining a location of the computer within a building, displaying, based on the location of the computer determined by the determining, a map illustrating a layout of a portion of the building, the map indicating a physical location of each of a plurality of devices within the portion of the building, and displaying, in response to a selection of a device of the plurality of devices, information of the device and an image of the device.

17 Claims, 19 Drawing Sheets

APPARATUS, METHOD, AND COMPUTER-READABLE STORAGE MEDIUM FOR DISPLAYING A MAP AND AN IMAGE OF A DEVICE

CROSS-REFERENCE TO RELATED APPLICATIONS

The present application is related to U.S. application Ser. No. 14/201,392, the entire content of which is incorporated herein by reference.

FIELD

The present application describes an apparatus that displays a map and an image of a device. An associated method and computer-readable storage medium are also described.

BACKGROUND

Locating a printing device can be challenging especially when a person is in an unfamiliar location. For example, when a person is in an unfamiliar office building (one that he or she has not previously visited), even if the person knows the name of the printing device, it is typically difficult to determine what floor of the building the printing device is located on. Moreover, even if the person knows the name of the printing device and the floor it is located on, it is difficult to determine where on the floor the printing device is located and also the physical characteristics and capabilities of the device. This provides frustration to the person as he or she has to spend a considerable amount of time locating a printing device suitable for the particular operations needed.

SUMMARY

An apparatus including processing circuitry to determine a location of the apparatus within a building, display, based on the location of the apparatus, a map illustrating a layout of a portion of the building, the map indicating a physical location of each of a plurality of devices within the portion of the building, and display, in response to a selection of a device of the plurality of devices, information of the device and an image of the device.

A method performed by a computing apparatus, the method including determining a location of the computing apparatus within a building; displaying, based on the location of the computing apparatus determined by the determining, a map illustrating a layout of a portion of the building, the map indicating a physical location of each of a plurality of devices within the portion of the building; and displaying, in response to a selection of a device of the plurality of devices, information of the device and an image of the device.

A non-transitory computer-readable storage medium including computer executable instructions, wherein the instructions, when executed by a computer, cause the computer to perform a method, the method including determining a location of the computer within a building; displaying, based on the location of the computer determined by the determining, a map illustrating a layout of a portion of the building, the map indicating a physical location of each of a plurality of devices within the portion of the building; and displaying, in response to a selection of a device of the plurality of devices, information of the device and an image of the device.

BRIEF DESCRIPTION OF THE DRAWINGS

The disclosure will be better understood from reading the description which follows and from examining the accompanying figures. These figures are provided solely as non-limiting examples of the embodiments. In the drawings.

DETAILED DESCRIPTION

It must be noted that, as used in the specification and the appended claims, the singular forms "a," "an," and "the" include plural referents unless the context clearly dictates otherwise. Thus, for example, reference to "a device" includes a plurality of devices.

Figure 1:
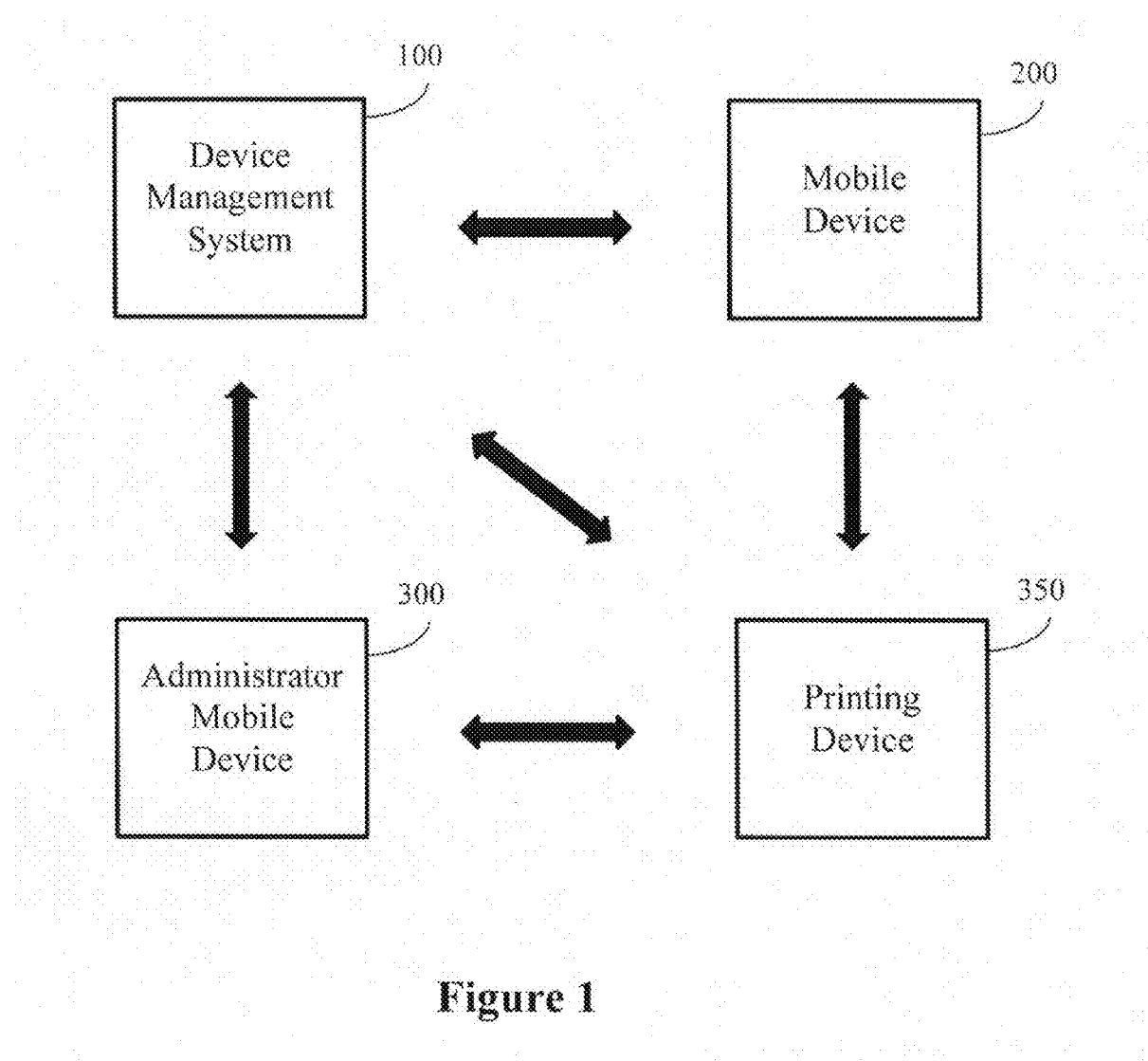
FIG. 1 illustrates a device management system, a mobile device, an administrator mobile device, and a printing device.

FIG. 1 shows computing devices upon which embodiments described herein may be implemented upon. In particular, FIG. 1 shows a device management system 100, a mobile device 200, an administrator mobile device 300, and a printing device 350. As noted above, it is to be understood that there may be a plurality of each of these aforementioned devices. Each of the devices in FIG. 1 may communicate with each other (as is shown by the arrows) via one or more networks (for example, a local area network (LAN) and/or another communications network, such as the Internet).

Figure 18:
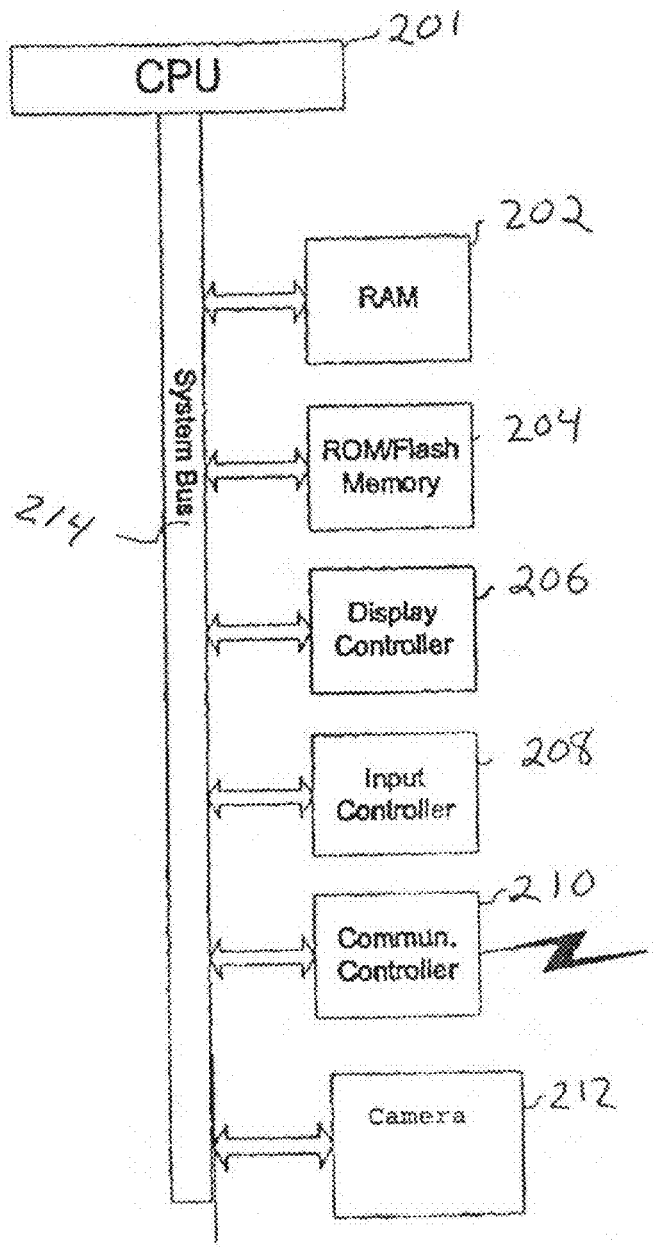
FIG. 18 shows an example of hardware included in the mobile device and the administrator mobile device.
Figure 19:
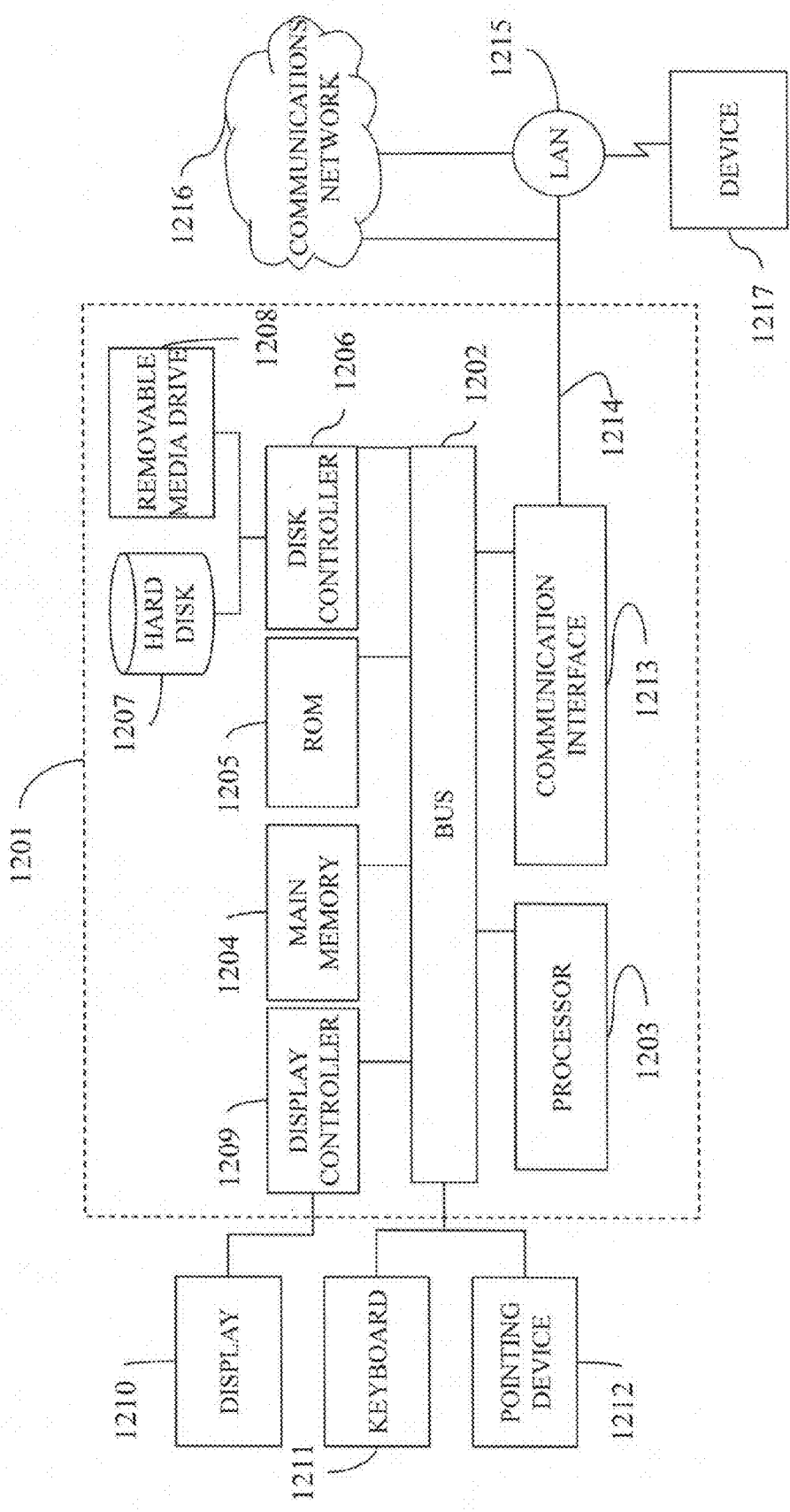
FIG. 19 illustrates a computer system that may be used with embodiments therein carried out by the mobile device, the device management system, or the administrator mobile device.

Mobile device 200 and administrator mobile device 300 may each be a cell phone or Smartphone. The mobile device 200 and the administrator mobile device 300 may have a configuration as shown in FIG. 18 or FIG. 19. Cell phones or Smartphones operating with Apples' software, Microsoft's software, RIM's Blackberry® software, or Google's Android® software may be used. These are merely examples, and other cell phone/software combinations may be used. Each of devices 200 and 300 may also be a tablet computer device, such as an IPad®. Again, other tablet/software combinations may be used. Each of devices 200 and 300 may also be a personal digital assistant (PDA). Each of devices 200 and 300 may also be a computer, which may operate with Apple's operating system, Microsoft's Windows®, Google's Android®, Linux, or other operating system software.

The printing device 350 may be a printer or a multi-function peripheral (MFP). Note that "printing device," "device," "printer," and "MFP" are used interchangeably throughout the present disclosure.

The device management system 100 may be a server or a computer system having a configuration as shown in FIG. 19. The device management system 100 provides support for mobile device 200 to print content (for example, from a phone or a tablet). When printing from a mobile device 200, locating the printer 350 the user of the mobile device 200 wishes to print to can be difficult. This is because users of mobile devices 200 are typically in unfamiliar areas (i.e., an office building he or she is unfamiliar with). Thus, there is a need to provide geographical and visual cues to the user to help identify and select nearby printing destinations that suit the user's needs.

The device management system 100 provides assistance to the users of the mobile device 200 by allowing the users to select printing resources based on administrator-provided maps and use visual cues through photographs (i.e., images of the devices) to help them find their print output. The maps provided by administrators are usually in the nature of floor plans, upon which icons are placed to represent printing resources. Images of the devices are captured by the administrators and can show the physical device characteristics and their environment or nearby points of interest that can help locate and identify the device, even when a user is in an unfamiliar area.

In one embodiment, devices are programmed via software to provide the functionality described below. When executed on each of mobile devices 200 and 300 (e.g., cell phone, smart phone, or tablet), such software is referred to as an "app." As discussed below, a client mobile application (client mobile app) is executed on the mobile device 200, and a device manager application (device manager app) is executed on the administrator mobile device 300.

FIGS. 2-13 illustrate a device manager application on the administrator mobile device 300 to be used by an administrator of the device management system 100. The device manager application accesses the device management system 100. The information shown in FIGS. 2-13 is stored at the device management system 100. The device manager application provides a hand-held interface for administrators to view devices and each of their status, history, and details such as counters, toner levels, etc. As noted above, the device manager application may be used with any mobile phone, tablet, PDA, computer, or the like. In one embodiment, the device manager application may run on Android, iOS, Windows Mobile, and Blackberry operating systems.

As discussed in more detail below, for each printer 350 of a plurality of printers, the administrator using the device manager application may view any images that have been associated with the respective device. These images may be available in a scrolling view, and each of the images may have a date and time and description associated with it. The administrator using the device manager application may also use the local camera on the hand-held administrator mobile device 300 to capture an image of a particular printing device 350 or of the surroundings of the particular device and upload the image to the device management system 100 where the image will be associated with the printing device 350 for use in identifying and locating the device.

Figure 2:
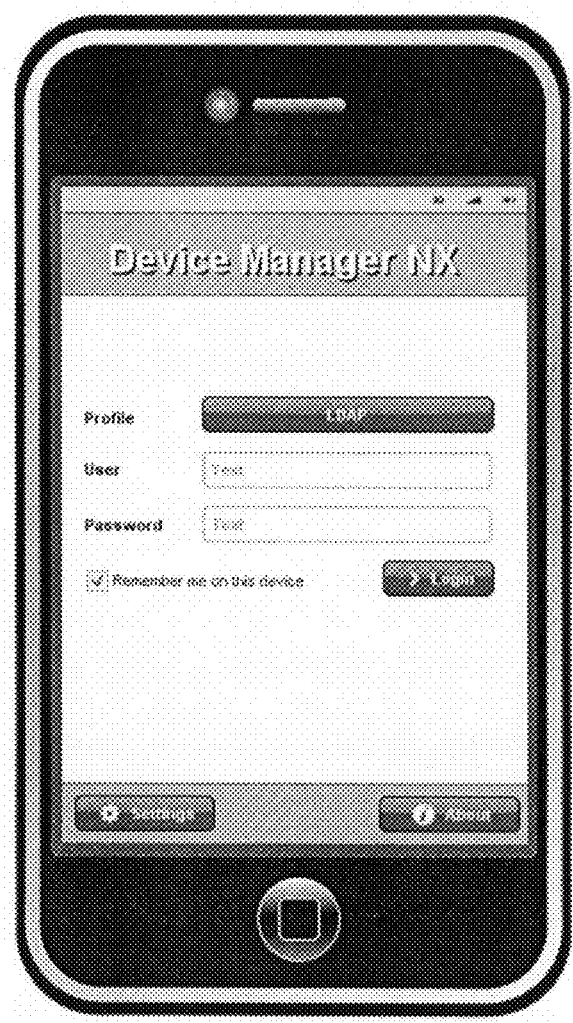
FIGS. 2-13 illustrate features of the administrator mobile device.

FIG. 2 shows a login screen, which is typically the first screen displayed by the device manager application on the administrator mobile device 300. The login screen is displayed whenever there is no valid login session. If a valid session exists (i.e., if administrator selected to save the credentials, and the server session has not expired), the home screen (shown in FIG. 3) will be displayed instead. Table 1 shows the item name, type, description, and action and result of the screen illustrated in FIG. 2.

TABLE 1

| Item Name | Type | Description | Action and Result |
| --- | --- | --- | --- |
| Profile | Drop-down list | | Selects the login profile |
| User | Edit box | Enter the user ID here | |
| Password | Edit box | Enter the password here | |
| Remember me on this device | Checkbox | Check to remember user credentials across sessions (subject to system settings) | |

TABLE 1-continued

| Item Name | Type | Description | Action and Result |
| --- | --- | --- | --- |
| Login | Button | Submits user ID and password to log in | Moves to home screen |
| Settings | Button | Settings button | Moves to settings screen |
| About | Button | About button | Moves to about screen |

Figure 3:

The home screen in FIG. 3 displays a high-level system status including the total number of devices and the number of devices in an error state. The home screen also provides access to the devices in those states, as well as access to group browsing and a search function. Table 2 shows the item name, type, description, and action and result of the screen illustrated in FIG. 3. Note that if the administrator is limited by a security role to a subset of devices, or has selected to view only a specific group in the settings screen, then only the numbers of accessible devices are displayed (and thus, not all printing devices 350 in the device management system 100).

TABLE 2

| Item Name | Type | Description | Action and Result |
| --- | --- | --- | --- |
| Total devices | Label | Displays total number of devices in device management system 100 | |
| Devices in error | Label + button | Displays total number of devices in device management system 100 in error state, excluding paper out and toner out | Moves to device list screen for devices in error |
| Devices out of toner | Label + button | Displays total number of devices in device management system 100 in toner out state | Moves to device list screen for devices with toner out |
| Devices out of paper | Label + button | Displays total number of devices in device management system 100 in paper out state | Moves to device list screen for devices with paper out |

Figure 4:

FIG. 4 illustrates a group selection screen that allows the administrator to select a category and then browse through the groups of devices in that category. Table 3 shows the item name, type, description, and action and result of the screen illustrated in FIG. 4.

TABLE 3

| Item Name | Type | Description | Action and Result |
| --- | --- | --- | --- |
| Browse by | Label + button | Pressing the button displays a pop-up list of available categories. | Selecting a new category will reset the group list to be the top-level groups for that category. |
| Group list | List with buttons | Displays the groups at the current level. Scrollable if the groups do not fit on the screen. | Pressing the button makes that group the new parent group. |
| Back | Button | | Returns to the previous screen |

Figure 5:
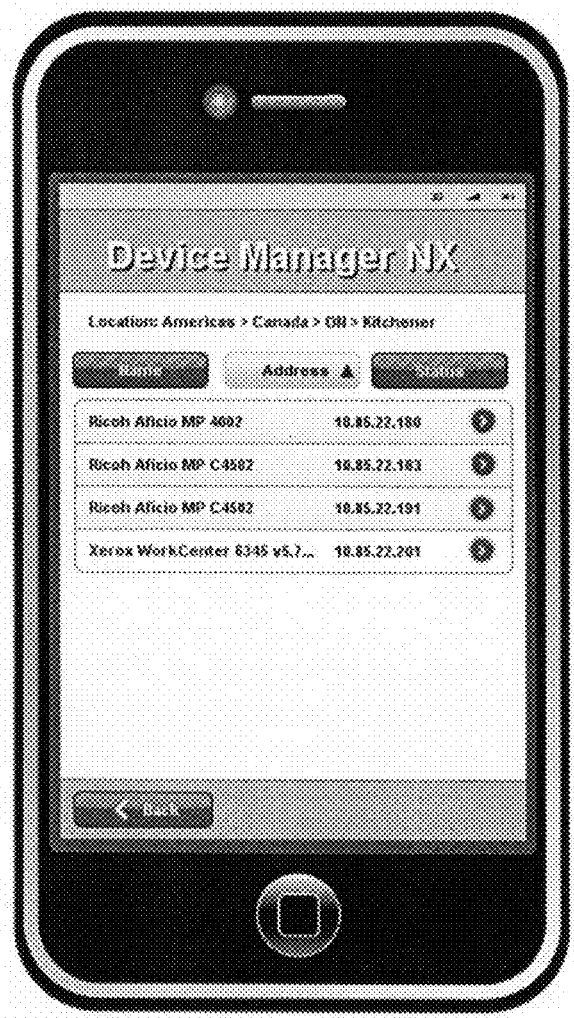

FIG. 5 illustrates a device list screen that allows the administrator to browse through a list of printing devices that has been filtered by a home screen search, a group browse, or error stat filtering from the home screen. Table 4 shows the item name, type, description, and action and result of the screen illustrated in FIG. 5.

TABLE 4

| Item Name | Type | Description | Action and Result |
|---|---|---|---|
| Criteria | Label | Device list criteria, whether a group, a search term or device status | |
| Name | Button | Device name sort button | Pressing once sorts ascending by device name; pressing again sorts descending. Active sort direction is shown with a sort direction icon and selected button color |
| Address | Button | Device address sort button | Pressing once sorts ascending by device address; pressing again sorts descending. Active sort direction is shown with a sort direction icon and selected button color |
| Status | Button | Device status sort button | Pressing once sorts ascending by device status; pressing again sorts descending. Active sort direction is shown with a sort direction icon and selected button color |
| Device list | List with buttons | Displays the devices Scrollable if the groups do not fit on the screen. | Pressing the button displays the device overview screen for that device. |
| Back | Button | | Returns to the previous screen |

Figure 6:
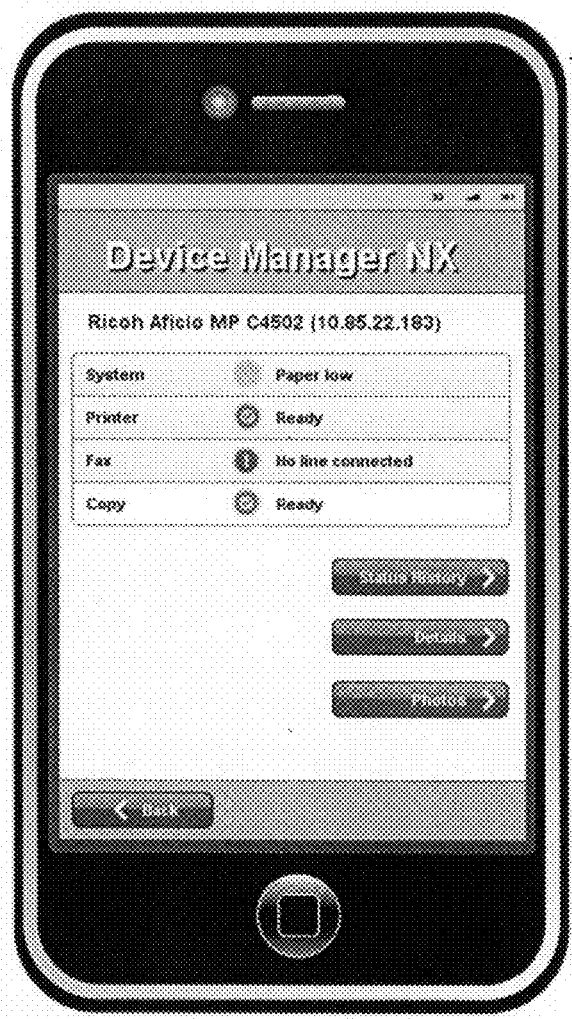

FIG. 6 illustrates a device overview screen that shows the administrator the status details for a selected device (in this case, Ricoh Aficio MP C4502) and allows the selection of further information about the device (such as, but not limited to, status history details, details, photographs/images, etc.). The icons representing the status of device may be displayed in different colors to visually illustrate to the administrator the status. For example, in FIG. 6, the icon next to "Paper low" may be designated in yellow, the "Ready" status next to "Printer" and "Copy" may be designated in green, and the "No line connected" status may be designated in red. This enables the administrator to get a quick idea of the status of the various features of a particular device. Table 5 shows the item name, type, description, and action and result of the screen illustrated in FIG. 6.

TABLE 5

| Item Name | Type | Description | Action and Result |
|---|---|---|---|
| Device | Label | Device display name | |
| Device status list | List | Displays the device status for each of the subsystems including icon and text | |
| Back | Button | | Returns to the previous screen |
| Status History > | Button | Device status history button | Displays the device status history |
| Details > | Button | Device details button | Displays the first device details page |
| Photos > | Button | Device photos | Displays the device photos page |

Figure 7:

FIG. 7 illustrates a device details screen that allows the administrator to view detailed information about the selected device. Table 6 shows the item name, type, description, and action and result of the screen illustrated in FIG. 7.

TABLE 6

| Item Name | Type | Description | Action and Result |
|---|---|---|---|
| Device | Label | Device display name | |
| Device details list | List | Displays the device properties. Scrollable. | Pressing the button displays the first page of the device details screen for that device. |
| Back | Button | | Returns to the previous screen |
| < | Button | Previous page button; disabled if not available | Displays preceding details page, if it exists |
| > | Button | Next page button; disabled if not available | Displays next details page, if it exists |

Figure 8:

FIG. 8 illustrates a device status history screen that shows the status history of the selected device. As can be seen in FIG. 8, each status of the device is associated with a date and time. Note that in this screen "Ready" may be designated by an icon that is in green and "Paper out" or "Paper jam" may be designated by an icon that is in red. Additionally, note that depending on the status, the aforementioned icons may be displayed with a combination of two different colors. For example, "Paper out" may be designated mainly by red, as noted above, with green along a side of the red, inside the circular icon. This may visually tell the administrator that although there is an error (i.e., "Paper out"), this error is of a minor nature, compared to an error that warrants the entire icon to be designated by red only. Table 7 shows the item name, type, description, and action and result of the screen illustrated in FIG. 8.

TABLE 7

| Item Name | Type | Description | Action and Result |
|---|---|---|---|
| Device | Label | Device display name | |
| History | List | Displays the status history for the selected device, including icons (which may include colors) and text | |
| Back | Button | | Returns to the previous screen |

Figure 9:

FIG. 9 illustrates a device photos screen that shows the images that have been saved for the selected device, and enables the administrator to take an additional image or images using a built-in camera of the administrator mobile device 300. Table 8 shows the item name, type, description, and action and result of the screen illustrated in FIG. 9.

TABLE 8

| Item Name | Type | Description | Action and Result |
|---|---|---|---|
| Device | Label | Device display name | |
| Image | Image | Displays the current photo (blank if there are no images) | |
| < Previous | Button | | Moves to the previous photo. Disabled if at the first photo. |
| Next > | Button | | Moves to the next photo. Disabled if at the last photo. |
| Add New | Button | | Activates the camera to capture and upload a new image |
| Back | Button | | Returns to the previous screen |

In addition, FIG. 9 also shows a "date" box which indicates the date and time the image was captured and a "description" box. The "description" box illustrated in the example of FIG. 9 includes the information "As installed." This description indicates that the image is of the device as it is installed in the particular room. As can be seen in FIG. 9, "Ricoh Aficio MP C4502" is installed (located) in front of a book case or cabinet.

The "description" box may be edited by the administrator (either at the time of capturing the image or at a subsequent time) to indicate, for example, the location of the device. For example, the "description" box may include information that the device is a department printer located on the third floor. The "description" box may include even more detailed information describing that the device is the third device located to the left of the entrance to Room 300 on the third floor. The "description" box may include additional information detailing the physical characteristics of the particular device (for example, device has a green tray, is missing a door panel, has indentations on a front panel, or the like), or characteristics of the device's surroundings (for example, device is located toward the back of the room, behind the conference table). In fact, any type of information that helps a user of mobile device 200 identify the particular device from other devices may be input by the administrator in the "description" box.

As noted above in Table 8, when the administrator selects the "Add New" icon on the screen illustrated in FIG. 9, the camera of the administrator mobile device 300 is initiated to capture and upload a new image. Once the administrator has captured the new image, the device manager application on the administrator mobile device 300 may automatically prompt the administrator to enter a description in the "description" box. After the description has been entered, the device manager application may resize the image to a system-configured size and then upload the image to the device management system 100. The device management system 100 then stores the image and associates (in a table, for example) the image and the description with the particular device.

The images of devices captured by the administrator are used to help a user of mobile device 200 identify the device from other devices. As such, in one embodiment, these images are not stock or model images of the device, but are rather captured of the actual device as it sits in, for example, the printing room in an office building. By the administrator capturing images including not only the device itself but also the surrounding objects (book case, table, water cooler, etc.), the user of mobile device 200 may better identify that particular device. Note that the surrounding object may be external and adjacent to the device.

Using the image shown in FIG. 9, a user is able to distinguish, for example, that this particular device has a colored paper tray (green in this example) and that the printer is located in front of a book case or cabinet (or next to a particular set of books on a shelf of the book case). Accordingly, when a user of mobile device 200 walks into, for example, a room where a plurality of printers are located, the user is able to quickly identify the desired printer by simply observing the image or images.

Figure 10:

FIG. 10 illustrates an about screen that shows the user information about the device manager application as well as the device management system 100. Note that the administrator may arrive at this screen by selecting "about" from the login screen of FIG. 2 or the home screen of FIG. 3. Table 9 shows the item name, type, description, and action and result of the screen illustrated in FIG. 10.

TABLE 9

| Item Name | Type | Description | Action and Result |
| --- | --- | --- | --- |
| Client version | Label | Version of device manager application | |
| Server version | Label | Version of device management system 100 | |
| Server edition | Label | Server or Enterprise | |
| Server licence | Label | Shows activation status | |
| Back | Button | | Returns to the previous screen |
| < | Button | Previous page button; disabled if not available | Displays preceding details page, if it exists |
| > | Button | Next page button; disabled if not available | Displays next details page, if it exists |

Figure 11:

FIG. 11 illustrates a settings screen that allows the administrator to configure the device manager application with the address of the device management system 100. Note that the administrator may arrive at this settings screen by selecting "settings" from the login screen of FIG. 2 or the home screen of FIG. 3. Table 10 shows the item name, type, description, and action and result of the screen illustrated in FIG. 11.

TABLE 10

| Item Name | Type | Description | Action and Result |
| --- | --- | --- | --- |
| Server address | Edit box | Enter the host name or IP address of device management system 100 | |
| Test connection | Button | Check connection to the server | Displays connection test result; if successful, saves the server address. See FIGS. 12 and 13 for results display. |
| Back | Button | | Returns to the previous screen |
| < | Button | Previous page button; disabled if not available | Displays preceding details page, if it exists |
| > | Button | Next page button; disabled if not available | Displays next details page, if it exists |

Figure 12:
Figure 13:

FIG. 12 illustrates the settings screen when a connection to the device management system 100 is successful. The color green may be shown next to "server connection OK" to visually indicate to the administrator that the connection is successful. FIG. 13 illustrates the settings screen when a connection to the device management system 100 has failed. The color red may be shown next to "server connection failed!" to visually indicate to the administrator that the connection was not successful.

The information discussed above with respect to FIGS. 2-13 may be stored at the device management system 100 in the form of tables. One such table is Table 11.

TABLE 11

| Name | Location | Floor/Room | Coordinates on Floor Map | Image(s) | Status/Information |
| --- | --- | --- | --- | --- | --- |
| Printer A | Kitchener, Ontario, Canada | First Floor, Room A | Coordinates A1, B1 | Image 1, Image 2, Image 3 | Paper low |

TABLE 11-continued

| Name | Location | Floor/Room | Coordinates on Floor Map | Image(s) | Status/Information |
|---|---|---|---|---|---|
| Printer B | Kitchener, Ontario, Canada | Third Floor, Room B | Coordinates B2, C2 | Image 1, Image 2 | Ready |
| Printer C | Kitchener, Ontario, Canada | Second Floor, Room A | Coordinates C3, D3 | Image 1, Image 2, Image 3, Image 4 | Cyan toner low |
| Printer D | Kitchener, Ontario, Canada | First Floor, Room C | Coordinates D4, E4 | Image 1, Image 2, Image 3, Image 4, Image 5 | Ready |
| Printer E | Alexandria, Virginia, U.S.A. | Fourth Floor, Room D | Coordinates E5, F5 | Image 1, Image 2, Image 3, Image 4 | Ready |
| Printer F | New York, New York, U.S.A. | Fortieth Floor, Room R | Coordinates F6, G6 | Image 1 | Paper jam |
| Printer G | Alexandria, Virginia, U.S.A. | Tenth Floor, Room A | Coordinates G7, H7 | Image 1, Image 2, Image 3 | Out of order |

Note that the "Coordinates on Floor Map" in Table 11 are the coordinates of the printer on the map. This allows the device management system 100 to place the icon representing the printer on the correct section of the floor map, discussed below.

In addition to the information and images discussed above, the device management system 100 also stores maps, each of which represents a layout of a floor in, for example, an office building. In one embodiment, the maps may depict only one or more portions of a floor, without depicting a floor in its entirety. This may be used, for example, when all of the printing devices are located within one section of a floor (such as a room or a plurality of rooms on, for example, the north side of the floor). In one embodiment, there may be a combination of the aforementioned in which, for a given office building, some maps represent floors in their entirety, while other maps represent only one or more portions of a floor.

These maps are maintained by the administrator of the device management system 100, and may be updated as needed. The updates may be carried out using the device manager application running on the administrator mobile device 300. Although not shown in the figures, the device manager application may also display a map showing the location of each device. For example, the screen illustrated in FIG. 6 may additionally display a "map" button. When selected, the floor map showing the location of the device (in this case, Ricoh Aficio MP C4502) is displayed for the administrator.

The maps are stored at the device management system 100 with associated network identification. For example, the maps have an associated ranking for each subnet mask that a mobile device (such as, mobile device 200) may be assigned to.

Since wireless access points often assign different subnet masks to connected users, the subnet masks can provide an approximation of the geographical location of the mobile device 200. For example, the wireless network on floor 1 of building A may use subnet 10.1.12.0, while floor 2 of building A may use subnet 10.2.33.0. The map for floor 1 of building A may then be assigned to the subnet with a higher priority while the map for floor 2 of building A may be assigned to a different subnet with a higher priority.

When a user uses a client mobile application on mobile device 200 and selects to print content, the user is automatically shown the relevant map based on the subnet of mobile device 200. In other words, the client mobile application on mobile device 200 uses network identification of the mobile device 200 (specifically, the subnet mask) to determine a list of most probable maps to be displayed to the user. The mobile device 200 then sends a request to the device management system 100 for a particular map or maps.

If no map for the current wireless subnet can be identified, mobile device 200 first presents to the user a choice of maps to browse. This may be presented to the user in the form of a list. When a map is selected by the user, the mobile device 200 displays an image of the selected floor map.

Figure 14:
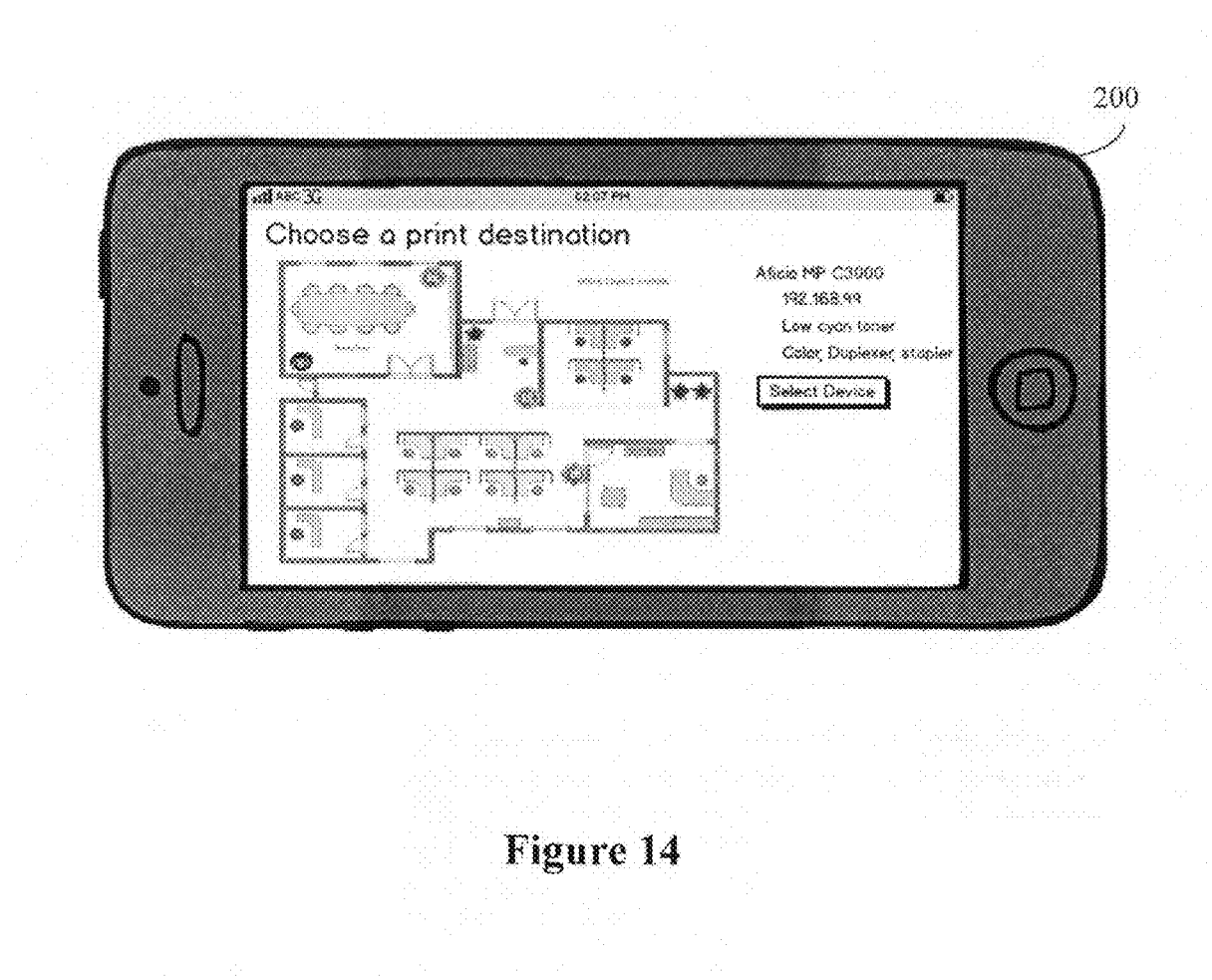
FIGS. 14 and 15 illustrate features of the mobile device.

FIG. 14 illustrates such floor map displayed for the user. As can be seen in the figure, the floor map displays all devices physically located on that floor using icons to represent each device. The icon representing the particular device may be outlined or highlighted with different colors (for example, red, yellow, or green), each color representing a status of the device. In one embodiment, red may signify that the particular printer is out of order; yellow may signify that the printer is low on toner or paper; and green may signify that the printer is ready.

As is further illustrated in FIG. 14, in one embodiment, an instruction (for example, "Choose a print destination") may be displayed prompting the user to perform an operation. In response, the user may select a particular printer (by a touch operation on the icon representing the printer on the screen of the mobile device 200) displayed on the floor map that he or she wishes to use or to learn more about.

In response to the user selection of a printer, additional printer information is displayed, for example, on the right side of the screen, as illustrated in FIG. 14. Note that the printer information may be displayed on any side of the screen or may be displayed as a pop-up window that pops up in response to the user selection of the particular printer. Such pop-up window may be displayed in the vicinity of the selected printer or anywhere else on the screen of the mobile device 200.

The additional printer information may include any type of information associated with the particular printer. For example, in one embodiment, the printer information may include items such as printer name, toner levels, paper levels, any error conditions, capabilities, and finishing options installed. In one embodiment, the device management system 100 polls each printer 350 (via Simple Network Management Protocol (SNMP) and/or custom protocols) for the various information discussed herein, and stores the received information in, for example, a database. The device management system 100 sends this information to the mobile device 200 upon request.

In addition, the printer information may also include one or more images of the printer for easy identification by the user, as discussed above. The one or more images may be images of the actual device itself in its physical location on the particular floor. As noted above, this helps the user identify the printer with greater ease than if the images were simply stock photos. In one embodiment, the image or images may be displayed adjacent to the rest of the printer information (in FIG. 14, on the right side of the screen). In one embodiment, in order to conserve space on the floor map screen, the image or images may be displayed as links, and upon selection of a link by the user, the respective image may be displayed in a new window or a pop-up window.

Furthermore, in one embodiment, the printer information may include information informing the user if he or she has used the particular printer in the past and what type of document was printed on the printer. For example, the printer information may indicate to the user that he or she has used this printer 1) to print a Microsoft's Word® document on Jul. 13, 2013 at 6:00 PM, and/or 2) to print, in color, and to staple handouts for a Microsoft's Power Point® presentation on May 10, 2012 at 5:07 PM.

This information may be stored (for example, for each registered user) by the device management system 100 in the form of a table. Thus, if the client mobile application running on the mobile device 200 requires log-in information from a user, the above information may be stored in a table in an associative manner with such log-in information.

In one embodiment, the printer information may also include information detailing the physical characteristics of the particular device (for example, device has a green tray, is missing a door panel, has indentations on a front panel, or the like), or characteristics of the device's surroundings (for example, device is located toward the back of the room, behind the conference table). In fact, any type of information that helps a user of mobile device 200 identify the particular device from other devices may be displayed as the printer information.

In the example shown in FIG. 14, the printer information includes printer name ("Aficio MP C3000"); address ("192.168.99"); status of the printer ("Low cyan toner"); and capabilities ("Color, duplexer, stapler"). However, the printer information may include additional information as discussed above. A "Select Device" option may also be displayed, as is further shown in FIG. 14. When the user decides that this particular printer is the print destination that he or she would like to use, the user selects the "Select Device" button, and the screen illustrated in FIG. 15 is thereby displayed.

Figure 15:
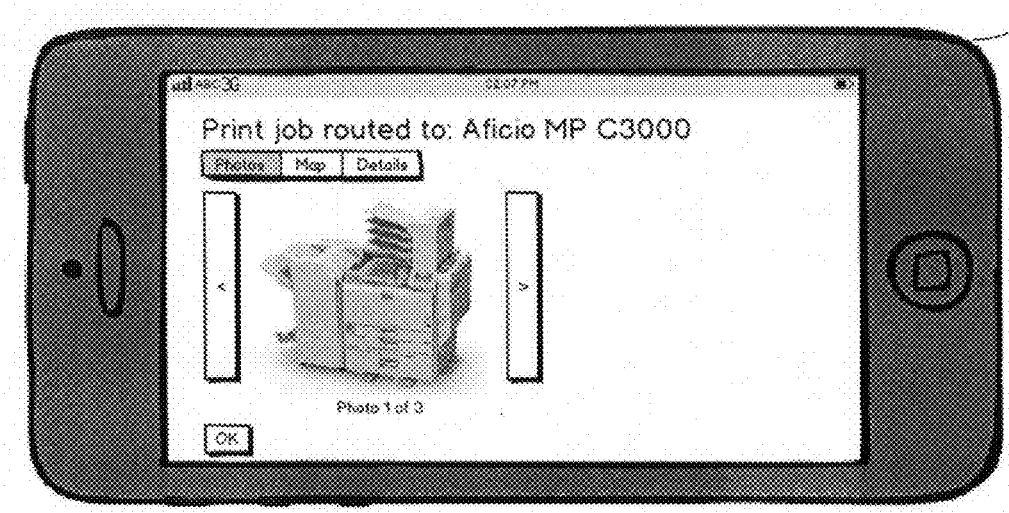

FIG. 15 illustrates a confirmation screen informing the user that the print job has been routed to the selected device (i.e., "Aficio MP C3000"). The screen also displays the image or images of the printer, as noted above. Note that the image or images may be displayed on the screen of FIG. 14, as discussed above, may be displayed on both the screen of FIG. 14 and the screen of FIG. 15, or may be displayed for the first time on the screen of FIG. 15 (i.e. only on the screen of FIG. 15 and not on the screen of FIG. 14).

As illustrated in FIG. 15, a first image of the printer is automatically displayed when the user selects the "Select Device" button of FIG. 14 and the screen of FIG. 15 is displayed. If additional images are available, the screen of FIG. 15 displays left and right arrows and informs the user that the current image being displayed is, for example, "Photo 1 of 3." The user may then use the right arrow to have "Photo 2 of 3" displayed, and so on.

The top of the screen illustrated in FIG. 15 includes, at least, a "Photos" button, a "Map" button, and a "Details" button. In the example of FIG. 15, the "Photos" button is indicated (highlighted in gray) as being selected, and hence the images of the printer are displayed. The user can select the "Map" button to have the floor map shown in FIG. 14 displayed in place of the images, and can select the "Details" button to have the printer information that is also shown in FIG. 14 be displayed in place of the image.

In one embodiment, the screens illustrated in FIGS. 14 and 15 may also display directions for the user to arrive at the physical location of the printer. For example, the user may be prompted to select, on the floor map displayed in FIG. 14, his or her current location as well as the particular printer he or she would like to use. Based on this selection, a screen may be displayed with step-by-step directions on how to arrive at the location of the printer. Such screen may be part of the screen shown in FIG. 15, and may display on the map the path the user should take.

Alternatively or in addition, a list of directions (in the form of text) may be displayed. In one embodiment, these directions may include generic directions (such as, "proceed to the south-end of the building"). In one embodiment, the directions may include directions detailing specific key reference points. In one embodiment, the directions may include a combination of generic and specific directions. For example, directions may include the following:

1) Exit the current room (Room 4000) and turn Right;
2) Proceed to the end of the hallway;
3) Turn Left at the water cooler;
4) Proceed through the Pantry;
5) Make the first Right into Room 4070; and
6) Printer (or Aficio MP C3000) is located at the far end of the room, past the filing cabinets.

These detailed directions, along with the images of the printer, allow the user to locate the desired printer with greater ease and efficiency. In one embodiment, the directions/visual cues may be generated by the administrator. In one embodiment, indoor geo-location technologies may be used by, for example, mobile device 200 or device management system 100, to determine user's location on the map and to provide/determine directions to the desired device. In one embodiment, a combination of directions/visual cues generated by the administrator and geo-location technologies may be used.

Figure 16:
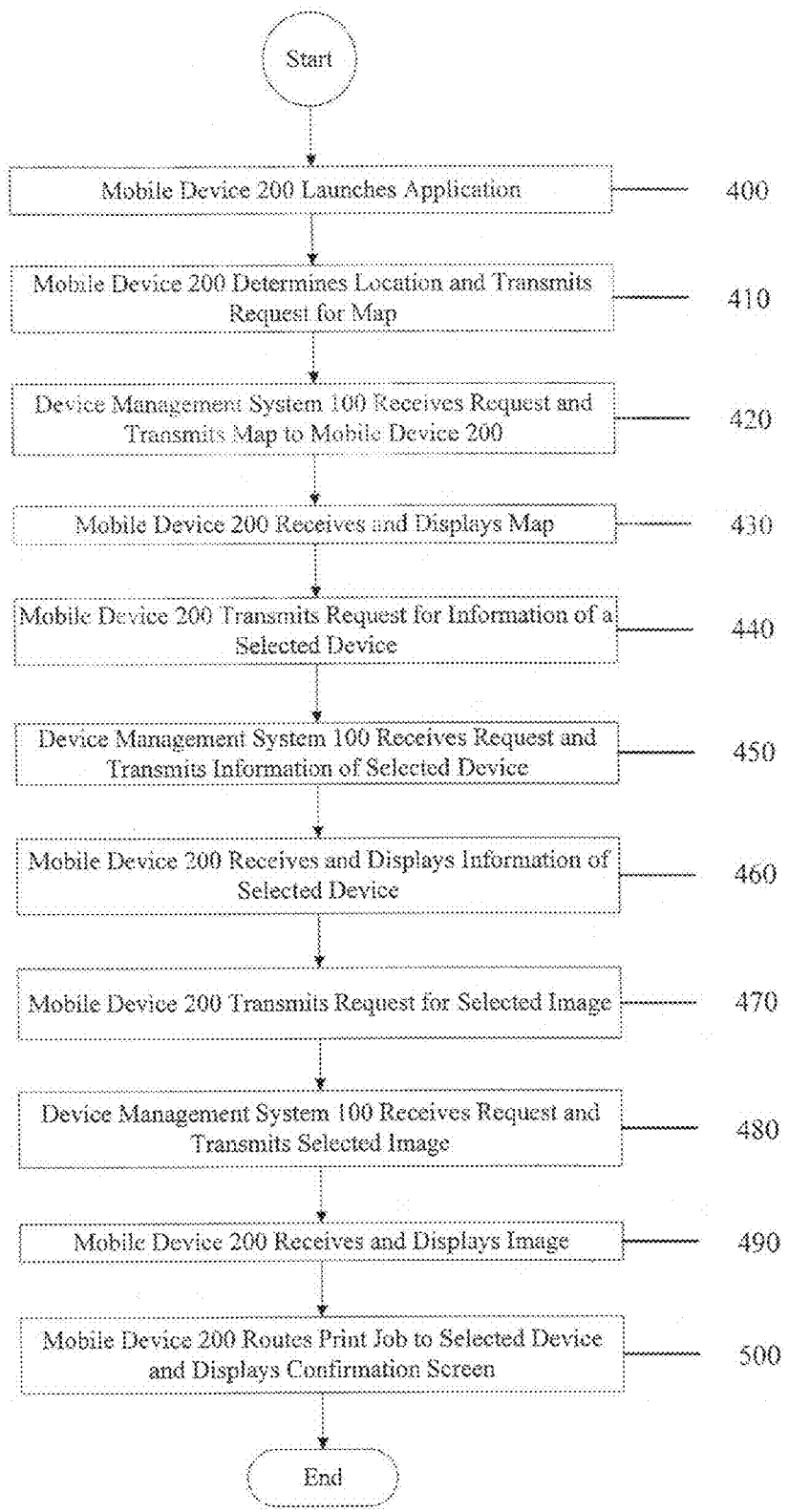
FIG. 16 is a flowchart of processes performed by the mobile device and the device management system.

FIG. 16 is a flowchart of an exemplary embodiment of the present disclosure. At step 400, the client mobile application is launched on the mobile device 200. At this step, the user may be prompted to log-in using a user ID and password. Logging-in to the application allows for customized settings or, as discussed above, a user profile or history of past printing operations and the device or devices that carried out these operations. Such information helps the user easily and efficiently recognize a familiar printer that he or she has used in the past.

Next, at step 410, the mobile device 200 determines its location (i.e., the floor the mobile device 200 is located on). As discussed above, this determination is performed by using the subnet mask of the mobile device 200. From the subnet, the mobile device 200 determines the map that most likely corresponds to the user's location, and transmits a request for such map to the device management system 100.

However, if the mobile device 200 cannot determine the map, the mobile device 200 may display a list of most probable maps to the user. This list may include, for example, the map for the second floor, the map for the third floor, and the map for the fourth floor. The user knowing that he or she is on, for example, the third floor, may then select the map for the third floor. The mobile device 200 may then transmit a request for the map of the third floor to the device management system 100, also at step 410. As noted above, the device management system 100 stores all the maps.

Next, at step 420, the device management system 100 receives the request and sends the requested map to the mobile device 200. At step, 430, the mobile device 200 receives the map from the device management system 100 and displays the map to the user, as is shown in FIG. 14.

Next, the user may study the displayed map and select a first device from the displayed map. Upon receiving such selection, the mobile device 200 transmits a request for information of the selected first device to the device management system 100, at step 440. At step 450, the device management system 100 receives the request and transmits information of the first device.

At step 460, the mobile device 200 receives and displays the information of the selected first device. This information corresponds to the information discussed above with respect to FIGS. 14 and 15. After reading the particular information displayed about the first device, the user may decide he or she does not wish to use this device. For example, the user may determine based on the displayed information indicating "low cyan toner" that the first device is not suitable to print the document the user wishes to print. Accordingly, the user decides to select another second device from the displayed map.

In studying the displayed information about the second device, the user may see that this particular device was used to print a Power Point® presentation in May 2012. He or she may recall that the quality of the printed figures and diagrams in the Power Point® presentation was not up to standard. As a result, the user may select yet another third device from the displayed map.

In studying the displayed information of the third device, the user decides that this device suits his or her printing needs. From the map, the user realizes that the third device is actually located in a room with many other devices. Thus, in order to determine what this device actually looks like, the user selects a link to an image of the device that is displayed as the information of the device.

At step 470, the mobile device 200 transmits a request for the selected image to the device management system 100. As noted above, the device management system 100 stores all the images for all devices.

Next, at step 480, the device management system 100 receives the request and transmits the requested image to the mobile device 200. At step, 490, the mobile device 200 receives and displays the image to the user.

As noted above, the image may be displayed as a pop-up window over the map of FIG. 14, may be displayed in its own window as shown in FIG. 15, or may be displayed initially in FIG. 14 and then in FIG. 15 after the user has selected the device via the "Select Device" button.

Finally, once the "Select Device" button has been selected, the mobile device 200 routes the print job to the selected device and displays a confirmation screen to the user, at step 500. In one embodiment, upon release of the print job to the selected device, the user may be requested by the device management system 100 to enter a password via the mobile device 200. In one embodiment, the selected device may request such password be entered either via the mobile device 200 or at the device itself.

Note that the user may select which document he or she would like to print either before launching the client mobile application on the mobile device 200 or at any time while the client mobile application has been launched. For example, in one embodiment, the mobile device 200 may prompt the user to select which document he or she would like to print before the user has selected the desired device, and before the displaying of the screen shown in FIG. 15.

Figure 17:
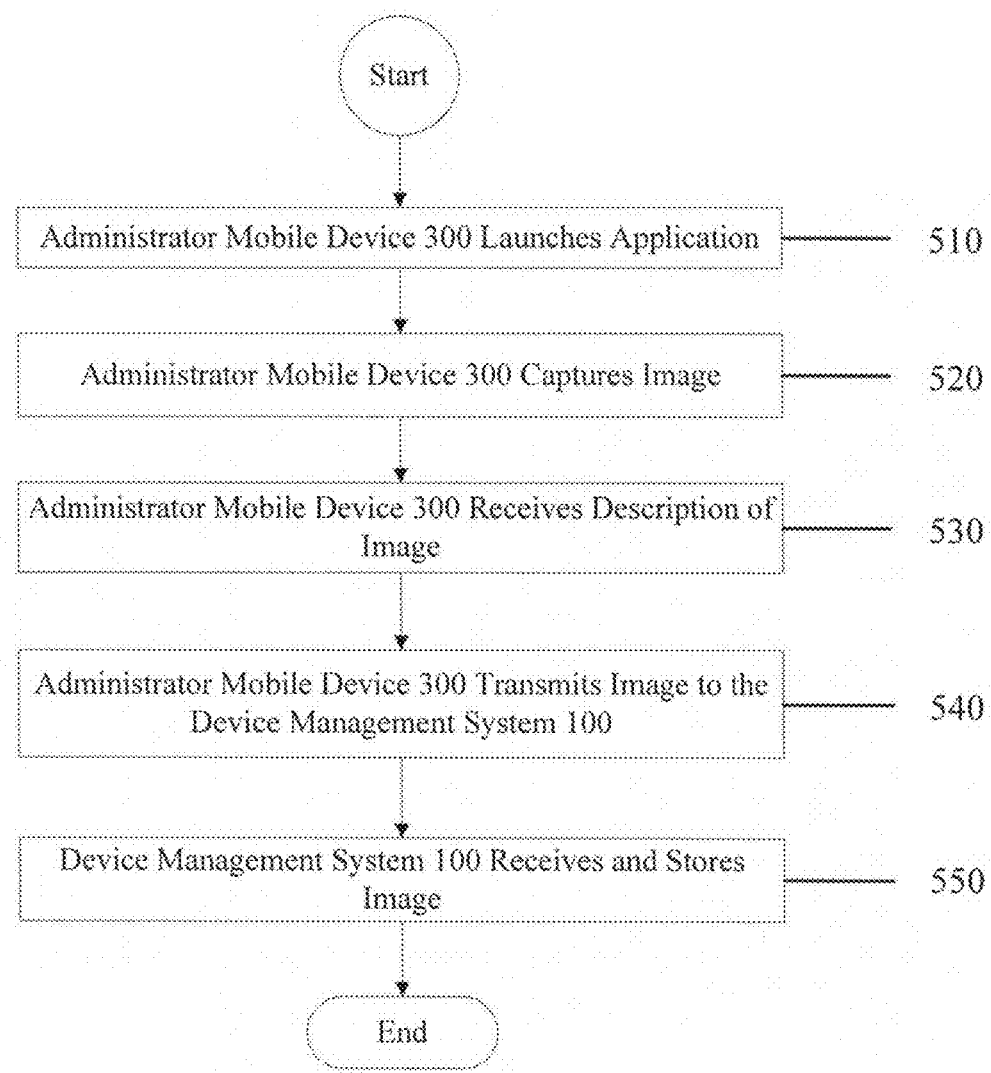
FIG. 17 is a flowchart of a process performed by the administrator mobile device and the device management system.

FIG. 17 is a flowchart of an exemplary embodiment of the present disclosure. In one embodiment, the process of FIG. 17 is performed before the process depicted in FIG. 16. At step 510, the device manager application is launched on the administrator mobile device 300. At this point, a user may navigate through the various screen discussed above with respect to FIG. 2-13.

Next, at step 520, the administrator mobile device 300 captures an image of a device, as is illustrated in FIG. 9. At step 530, the administrator mobile device 300 receives as input a description of the captured image. As illustrated in FIG. 9 and as noted above, the description is entered in the "description" box.

At step 540, the administrator mobile device 300 transmits the captured image of the device to the device management system 100. Next, at step 550, the device management system 100 receives and stores the image. As discussed above, this image is stored (for example, in a table) in association with the device depicted in the image.

Each of the functions described in the embodiments may be implemented by one or more processing circuits. A processing circuit includes a programmed processor (for example, CPU 201 of FIG. 18 or processor 1203 of FIG. 19), as a processor includes circuitry. A processing circuit also includes devices such as an application specific integrated circuit (ASIC) and conventional circuit components arranged to perform the recited functions.

FIG. 18 shows a block diagram of the hardware that may be found in the mobile device 200 and the administrative mobile device 200. Each of devices 200 and 300 includes, for example, CPU 201, RAM 202, ROM 204, display controller 206, input controller 208, communications controller 210, and camera 212. The various hardware units are interconnected by way of system bus 214. The CPU 201 processes instructions or sequences of instructions stored in the RAM 202 and/or ROM 204 in response to input commands of a user via input controller 208. The display controller controls the display of images and text on the display in response to commands from the CPU 201. Communications controller 210 allows the device to receive and process wireless digital data from a production printer and/or other electronic devices on the wireless LAN. The communication controller 210 may also provide access to the Internet. Communications controller 210 may communicate with 3G protocols, 4G protocols, bluetooth, or wi-fi. It is to be understood that the items in the block diagram of FIG. 18 are exemplary items intended to provide exemplary hardware in each of devices 200 and 300. Each of devices 200 and 300 may incorporate any of the components of a known wireless computing device such as Apples' IPod®, IPad®, netbooks, laptops, or desktop computers.

FIG. 19 illustrates an alternative computer system 1201 upon which an embodiment (of device management system 100, of mobile device 200, or of administrator mobile device 200) described herein may be implemented.

The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The processor 1203 executes one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to another device 1217 such as a personal digital assistant (PDA), laptop computer, or cellular telephone.

Obviously, numerous modifications and variations of the embodiments described herein are possible in light of the above teachings. It is therefore to be understood that within the scope of the appended claims, the invention may be practiced otherwise than as specifically described herein.

The invention claimed is:

1. An apparatus, comprising:
   processing circuitry to
      determine a location of the apparatus within a building,
      display, based on the location of the apparatus, a map
         illustrating a layout of a portion of the building, the map indicating a physical location of each of a plurality of devices within the portion of the building, and display, in response to a selection of a device of the plurality of devices, information of the device and an image of the device, wherein the processing circuitry determines which map to display from a plurality of maps based on a subnet mask of the apparatus, and receives from an external device, after determining which map to display, the map.

2. The apparatus of claim 1, wherein the portion of the building corresponds to an entire floor of the building.

3. The apparatus of claim 1, wherein the device is one of a printer and a multi-function peripheral (MFP).

4. The apparatus of claim 1, wherein the device is one of a printer and a multi-function peripheral (MFP), and the information of the device includes one of a device name, a device address, a device status, a toner level, a paper level, device capabilities, and finishing options.

5. The apparatus of claim 1, wherein the device is one of a printer and a multi-function peripheral (MFP), and the information of the device includes a list of one or more documents previously printed at the device, and a date and time the one or more documents were printed.

6. The apparatus of claim 1, wherein the processing circuitry receives an input of a current location of the apparatus on the map, provides directions on how to arrive at the physical location of the device from the current location of the apparatus, and displays the directions.

7. The apparatus of claim 1, wherein the processing circuitry determines the location of the apparatus based on the subnet mask of the apparatus.

8. The apparatus of claim 1, wherein the processing circuitry displays a plurality of images of the device, each of the images of the device is captured by an administrator at an external device, a first image of the images is an actual, non-stock image of the device, and a second image of the images is an image of the device at the physical location of the device and of an object that is external and adjacent to the device.

9. A method performed by a computing apparatus, the method comprising:

determining a location of the computing apparatus within a building;

determining which map to display from a plurality of maps based on a subnet mask of the computing apparatus;

receiving from an external device, after the determining determines which map to display, the map;

displaying the map received by the receiving, the map illustrating a layout of a portion of the building and indicating a physical location of each of a plurality of devices within the portion of the building; and displaying, in response to a selection of a device of the plurality of devices, information of the device and an image of the device.

10. The method of claim 9, wherein the portion of the building corresponds to an entire floor of the building.

11. The method of claim 9, wherein the device is one of a printer and a multi-function peripheral (MFP).

12. The method of claim 9, wherein the device is one of a printer and a multi-function peripheral (MFP), and the information of the device includes one of a device name, a device address, a device status, a toner level, a paper level, device capabilities, and finishing options.

13. The method of claim 9, wherein the device is one of a printer and a multi-function peripheral (MFP), and the information of the device includes a list of one or more documents previously printed at the device, and a date and time the one or more documents were printed.

14. The method of claim 9, further comprising:

receiving an input of a current location of the computing apparatus on the map;

providing directions on how to arrive at the physical location of the device from the current location of the computing apparatus, wherein the displaying of the information displays the directions.

15. The method of claim 9, wherein the determining of the location determines the location of the computing apparatus based on the subnet mask of the computing apparatus.

16. The method of claim 9, wherein the displaying of the image displays a plurality of images of the device, each of the images of the device is captured by an administrator at an external device, a first image of the images is an actual non-stock image of the device, and a second image of the images is an image of the device at the physical location of the device and of an object that is external and adjacent to the device.

17. A non-transitory computer-readable storage medium including computer executable instructions, wherein the instructions, when executed by a computer, cause the computer to perform a method, the method comprising:

determining a location of the computer within a building;

determining which map to display from a plurality of maps based on a subnet mask of the computing apparatus;

receiving from an external device, after the determining determines which map to display, the map;

displaying the map received by the receiving, the map illustrating a layout of a portion of the building and indicating a physical location of each of a plurality of devices within the portion of the building; and displaying, in response to a selection of a device of the plurality of devices, information of the device and an image of the device.

* * * * *